United States Patent
Doss et al.

(10) Patent No.: US 7,096,232 B2
(45) Date of Patent: Aug. 22, 2006

(54) CALENDAR-ENHANCED DIRECTORY SEARCHES INCLUDING DYNAMIC CONTACT INFORMATION

(75) Inventors: J. Smith Doss, Raleigh, NC (US); Renee Marie Kovales, Cary, NC (US); Diane Phylis Pozefsky, Chapel Hill, NC (US); Robert Joseph Sundstrom, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 846 days.

(21) Appl. No.: 09/875,556

(22) Filed: Jun. 6, 2001

(65) Prior Publication Data

US 2002/0188620 A1    Dec. 12, 2002

(51) Int. Cl.
*G06F 17/30* (2006.01)
*G06F 15/16* (2006.01)

(52) U.S. Cl. .................. 707/104.1; 707/1; 707/3; 709/204; 709/205; 715/751

(58) Field of Classification Search ......... 379/211.01, 379/207.04; 703/23; 705/8, 51; 707/1, 707/3, 104.1; 709/204, 205, 220; 715/751
See application file for complete search history.

(56) References Cited

U.S. PATENT DOCUMENTS

| 6,065,012 A | * | 5/2000 | Balsara et al. | ............... 707/102 |
| 2002/0116336 A1 | * | 8/2002 | Diacakis et al. | ............... 705/51 |

* cited by examiner

*Primary Examiner*—Jeffrey Gaffin
*Assistant Examiner*—Hassan Mahmoudi
(74) *Attorney, Agent, or Firm*—Stevens and Showalter

(57) ABSTRACT

A method, system, and product are disclosed for displaying directory information and dynamically updated contact information for one or more people in response to a directory search. A user submits a query criteria when the directory search is requested. A search of the directory information is first executed utilizing the query criteria to return a first result set. A search of dynamically updated contact information is then executed using the first result set to produce a second result set. A final result of the directory search request is then produced by coalescing the first and second result sets. This final result includes both directory information and dynamically updated contact information for each person whose name was included in the final result.

69 Claims, 4 Drawing Sheets

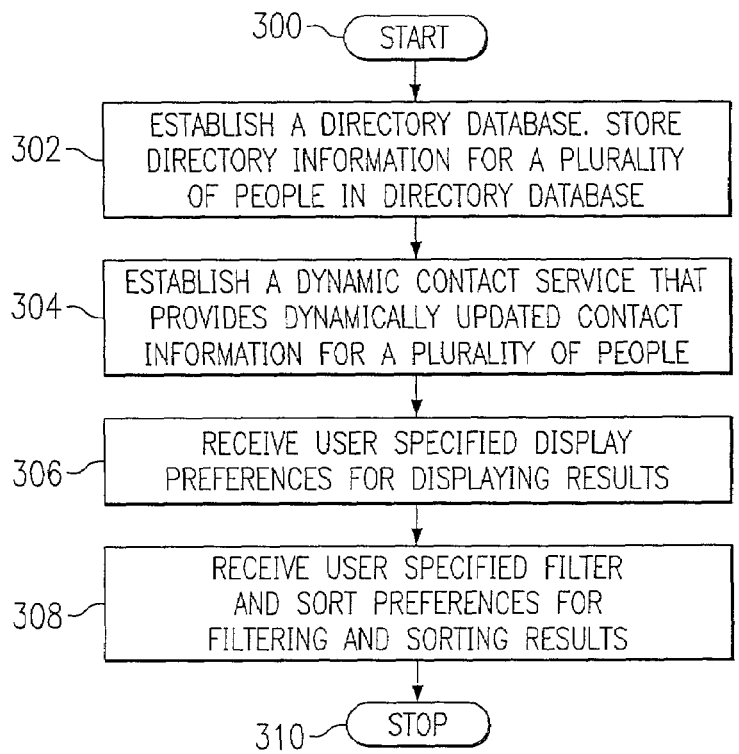

| NAME: | SUNDSTROM, ROBERT |
|---|---|
| E-MAIL ADDRESS: | ROBERT SUNDSTROM@COMPANY.COM |
| INTERNET ADDRESS: | BSUNDSTROM@US.COMPANY.COM |
| MANAGER: | POZEFSKY, DIANE |
| BACKUP: | DOSS, SMITH |
| BUSINESS ADDRESS: | P.O. BOX 6464 |
| | 3217 WESTMINSTER |
| | RESEARCH TRIANGLE PARK, NC 27709 |
| EXTERNAL TELEPHONE: | 1-919-555-1234 |
| FAX NUMBER: | 1-919-555-9875 |
| PAGER ADDRESS: | 1-919-555-3746 |
| STATUS: | OUT OF THE OFFICE |
| AVAILABLE IN-PERSON: | 1:00 02/28/01 |
| AVAILABLE BY PHONE: | CELL PHONE (919-555-3454) AT 2:00 TODAY |
| IMMEDIATE CONTACT MEANS: | PAGER |
| ALTERNATE CONTACT PERSON: | BACKUP |

FIG. 6

```
              10 WERE FOUND-3 ARE AVAILABLE TODAY

1)   J. SMITH DOSS
     IN THE OFFICE, CURRENTLY AVAILABLE, TELEPHONE: 1-919-555-1123

2)   RENEE KOVALES
     IN THE OFFICE, BUSY UNTIL 1:00, AVAILABLE THEN AT ALTERNATE WORK LOCATION:
              1-919-555-3374
     AVAILABLE NOW VIA INSTANT MESSAGING: RKOVALES@COMPANY.COM

3)   ROBERT SUNDSTROM
     IN THE OFFICE, BUSY ALL DAY, AVAILABLE FOR URGENT MATTERS NOW BY PAGER:
              BSUNDSTROM@PAGER.COM
     BACKUP:  SMITH DOSS

SELECT AN INDIVIDUAL FOR MORE DETAILED INFORMATION

<CLICK HERE FOR ADDITIONAL EXPERTS LOCATED DURING DIRECTORY SEARCH>
```

CALENDAR-ENHANCED DIRECTORY SEARCHES INCLUDING DYNAMIC CONTACT INFORMATION

CROSS-REFERENCE TO RELATED APPLICATIONS

The present invention is related to the subject matter of co-pending patent application Ser. No. 09/670,844 entitled "CALENDAR EVENTS AND CALENDAR-DRIVEN APPLICATION TECHNIQUE", filed on Sep. 27, 2000, and co-pending patent application Ser. No. 09/671,001 entitled "CALENDAR-DRIVEN APPLICATION TECHNIQUE FOR PREPARING RESPONSES TO INCOMING EVENTS", filed on Sep. 27, 2000, both assigned to the assignee herein and incorporated herein by reference.

BACKGROUND OF THE INVENTION

The present invention relates to a computer system, and more particularly to a method, system, and product for providing calendar-based dynamic contact information as an enhancement to directory search results.

Calendars, and electronic calendars in particular, often contain a wealth of information about their owner. For example, an individual may use an electronic calendar to maintain information about his work schedule, his meetings and other appointments, his vacation and business travel plans (including when he will be away, which flights or other transportation he will use, where he can be reached while away, who he may visit while away, etc.), phone calls that need to be made at particular times, and so forth. Examples of electronic calendaring systems include Microsoft Outlook 2000, Lotus Organizer, and Lotus Notes. Such systems are quite popular among users. "Outlook" is a trademark of Microsoft Corporation. Lotus Organizer and Lotus Notes are trademarks of Lotus Development Corporation.

Use of electronic calendaring systems for purposes such as scheduling meetings of multiple persons is known in the art. For example, an invitation list may be created for a particular meeting, and a calendaring software application may then use this list to check each invitee's calendar for available time periods. A meeting may then be scheduled during a time period in which all, or some majority, of the invitees have sufficient time available on their calendar. However, it is desirable to more fully exploit the information stored in the calendaring system.

An automated system is described in the Applicants' related patent applications whereby electronic calendar-based engines are used to drive other software applications and agents, such as software agents that respond to e-mail and telephone calls and provide automated responses regarding the recipient's current availability. The automated system maintains a database of dynamically updated contact information for a plurality of people or other entities as trucks or airplanes. The automated system accesses the dynamic contact service in order to determine a recipient's current availability. For example, the automated system may determine, utilizing the dynamic contact database, when the person is out of the office and could automatically generate the appropriate responses to incoming e-mails, telephone calls, etc., during the duration that the person is out of the office.

The automated system obtains information about a person's status, such as "in the office", "out of the office", "outside working hours", etc., from the individual's calendar. The automated system then combines this status information with preferences specified by this person that describe how the person could be contacted most immediately, an alternate contact, the frequency with which the person accesses voice mail and/or e-mail, and other information. The combined information obtained from the calendar and the preferences information is either stored in the dynamic contact database or derived real-time.

Directories and directory searches are known in the art. Directory information typically includes a person's telephone number, address, a fax number, and other information that tends to change very infrequently. People may execute directory searches to retrieve this static directory data for a person or group of people many times in an attempt to contact the person via telephone, in-person, or by some alternative means. While obtaining the information from the directory can be easily accomplished using the directory search capabilities, contacting the people may not be as easy. The problem associated with contacting people can be best appreciated by an example.

Suppose a user utilizes a Knowledge Management (KM) system to obtain a list of experts in a particular field. The KM system provides a list of twenty names. The user must then use the directory to obtain the phone numbers for these people. The user may then attempt to call each of these twenty people. If the user is unable to reach any of these people by telephone, the user must then attempt to locate the people, such as by reading their calendars or contacting their managers.

Therefore, a need exists for a method, system, and product that enhances directory search results with calendar-based dynamic contact information.

BRIEF SUMMARY OF THE INVENTION

A method, system, and product are disclosed for enhancing directory search results with calendar-based dynamic contact information. A user first requests an enhanced directory search and specifies a query criteria to use when executing the enhanced search. The enhanced search is executed in two parts. First, a search of the directory information is executed using the query criteria, which produces a first search result set. Next, a dynamic contact service determines dynamic contact information for the members of the first result set. The dynamic contact service determines the dynamic contact information for each member of the first result set by either searching a dynamic contact database or by generating the dynamic contact information in response to the directory search request. The dynamic contact service returns the dynamic contact information as a second result set.

In some cases, the search of the directory information will result in a null set. Therefore, the first result set will not include any members. In these cases, the dynamic contact service determines dynamic contact information using the original query criteria.

The first and second result sets are then coalesced into a single, coalesced result set. The results included in the coalesced result set are then filtered, sorted, and displayed according to the user's specifications. The final coalesced result set may include, but is not limited to, the name, e-mail address, phone number, current status, next time available via telephone, next time available in person, how to contact most immediately at this time, and alternate contact person for each person whose information was returned as part of the coalesced result set. The coalesced result set may be viewed directly, or may be used as an input into other applications.

The above as well as additional objectives, features, and advantages of the present invention will become apparent in the following detailed written description.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a high level flow chart that illustrates establishing a directory database and a dynamic contact information service, and preferences in accordance with the present invention;

FIG. 5 is an example of a graphical user interface display screen which displays a single, coalesced result set returned in response to a directory search in accordance with the present invention; and FIG. 6 is an example of a graphical user interface display screen that displays the results of a directory search which produced multiple names in accordance with the present invention.

DETAILED DESCRIPTION OF THE INVENTION

Figure 1:
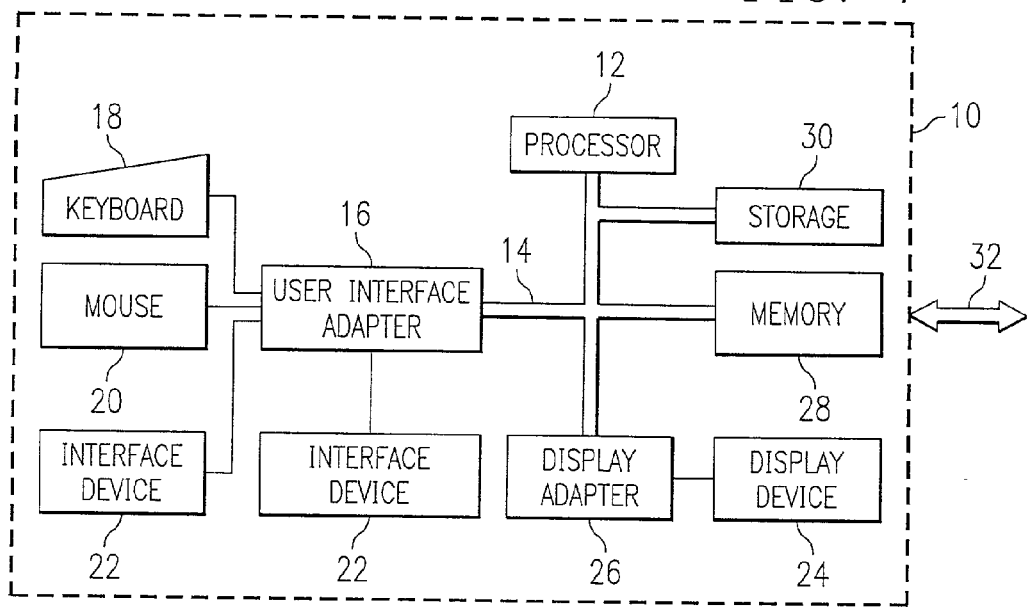
FIG. 1 illustrates a representative workstation hardware environment in which the present invention may be practiced.

A preferred embodiment of the present invention and its advantages are better understood by referring to the figures, like numerals being used for like and corresponding parts of the accompanying figures.

The invention is preferably realized using a well-known computing platform, such as an IBM RS/6000 server running the IBM AIX operating system. However, it may be realized in any computer system platforms, such as an IBM personal computer running the Microsoft Windows operating system or a Sun Microsystems workstation running operating systems such as UNIX or LINUX or a router system from Cisco or Juniper, without departing from the spirit and scope of the invention.

The present invention is a method, system, and product for providing coalesced directory information and dynamically updated contact information for one or more people or other entities in response to a directory search. Directory information is kept in a directory database. The directory information is static.

The contact information is provided by a dynamic contact service. In order to provide the dynamic contact information, the service may either search a dynamic contact database where the dynamic contact information is stored, or may dynamically determine the contact information in response to each search request. When the contact information is stored in a contact database, the contact information is updated dynamically so that the information indicates a current status of the entities whose information is included in the dynamic contact database.

Directory information typically includes information about a person that does not tend to change, such as telephone number, address, fax number, and other directory information. The contact information describes a current contact availability of a person. Further, the contact information may give detailed information based on calendar events regarding best methods for contacting a person. For example, a person may be currently working out of a home office. The contact information will indicate that the person is currently in the home office and may preferably give the home office number. As another example, a person may be currently in the office, logged onto the computer, but talking on the telephone. This person's contact information may preferably indicate that the person is in the office and on the telephone. Further, this person's contact information may indicate that the person is currently available for an instant message transmitted via the computer system. When the status of these people change, such as when the current calendar event ends, the contact information provided by the dynamic contact service will reflect that change.

When a directory search is conducted, the user for whom the search is executed will often want to try to contact one or more of the people included in the directory search. Therefore, the present invention provides a method, system, and product for returning both the static directory information as well as the dynamically-updated contact information coalesced as one result in response to the search.

In addition, the present invention may be utilized to present the results of a directory search according to preferences specified by a user. For example, a user may specify that the information for only a particular number of people be displayed. Or, a user may desire to see the results arranged according to which people are available for immediate telephone contact.

A query criteria is first specified. The query criteria may be one or more names, one or more telephone numbers, one or more e-mail addresses, or any other type of information which may be associated with people or other entities whose information is stored in the directory database.

For example, a user may submit a list of names to use when executing a directory search. A directory search is then executed for this list of names. Directory information and dynamic contact information are then obtained for each name on the list. Once the information is obtained for each name on the list, the information is sorted and filtered according to the user's preferences. The directory and dynamic contact information is then coalesced into a single result for each name on the list that is to be displayed.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, or other type of storage device.

Figure 2:
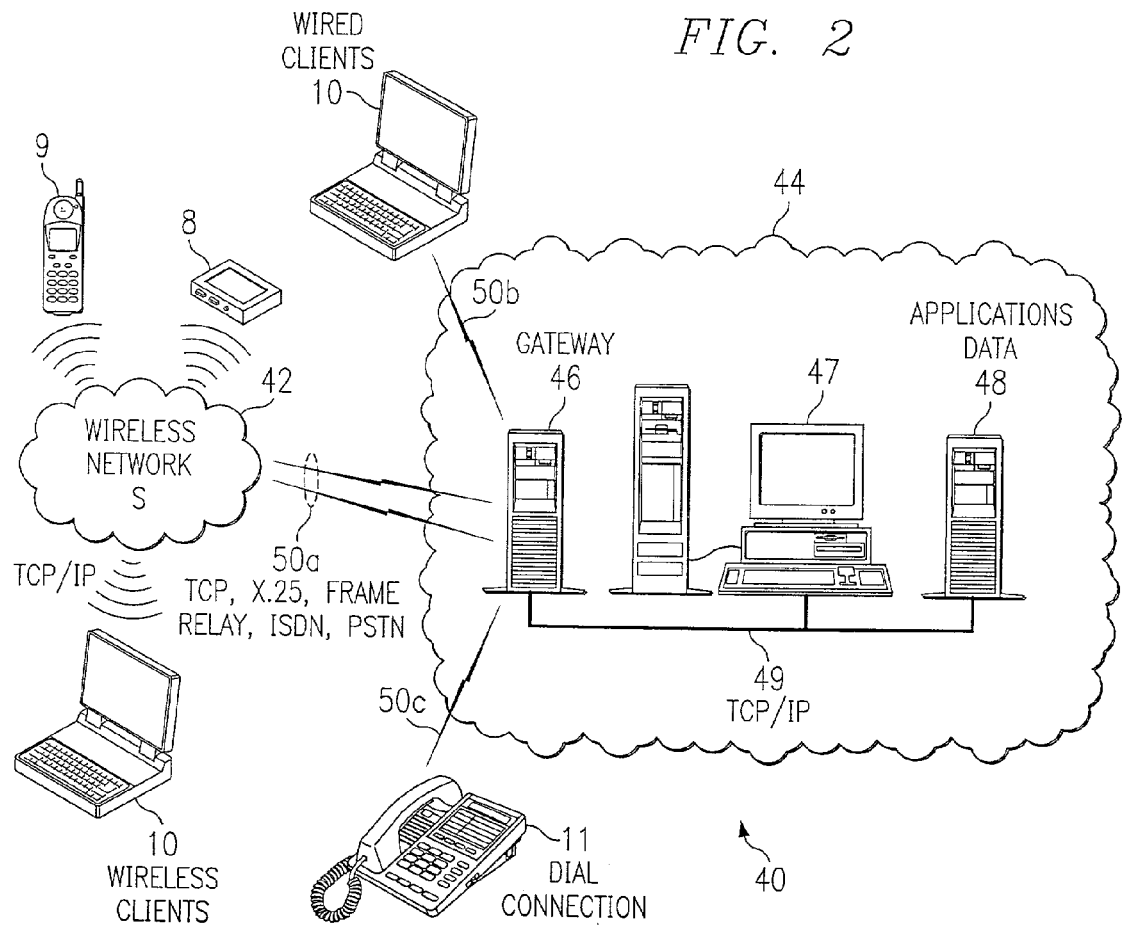
FIG. 2 illustrates a data processing network in which the present invention may be practiced.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a local area network (LAN) or a wide area network (WAN), or the workstation 10 can be a client in a client/server arrangement with another computer FIG. 2 illustrates a data processing network 40 in which the present invention may be practiced. The data processing network 40 may include a plurality of individual networks, such as wireless network 42 and network 44, each of which may include a plurality of individual workstations 10 and other devices such as pagers 8 and cellular phones 9. Additionally, as those skilled in the art will appreciate, one or more LANs may be included (not shown), where a LAN may comprise a plurality of intelligent workstations and other devices coupled to a host processor. Furthermore, devices such as conventional telephones 11 may access the features of the present invention by connecting to a computing network through one or more telephone switches (not shown).

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, or to other devices such as those shown at element 11 through a link 50c. The gateway computer 46 may be implemented utilizing an Enterprise Systems Architecture/370 available from the International Business Machines Corporation ("IBM"), an Enterprise Systems Architecture/390 computer, or other suitable computer system. Depending on the application, a midrange computer, such as an Application System/400 (also known as an AS/400) may be employed. "Enterprise Systems Architecture/370" is a trademark of IBM; "Enterprise Systems Architecture/390", "Application System/400", and "AS/400" are registered trademarks of IBM.

The gateway computer 46 may also be coupled 49 to a storage device, such as data repository 48. Further, the gateway 46 may be directly or indirectly coupled to one or more workstations 10 and other devices such as those shown at elements 8 and 9.

Those skilled in the art will appreciate that the gateway computer 46 may be located a great geographic distance from the network 42, and similarly, the workstations 10 and other devices 8, 9, 11 may be located a substantial distance from the networks 42 and 44. For example, the network 42 may be located in California, while the gateway 46 may be located in Texas, and one or more of the workstations 10 may be located in New York. The workstations 10 and other devices such as those shown at elements 8 and 9 may connect to the wireless network 42 using a networking protocol such as the Transmission Control Protocol/Internet Protocol ("TCP/IP"), AppleTalk®, a particular wireless networking protocol, such as the Wireless Application Protocol, or "WAP", the Global System for Mobile communications, or "GSM", or the Systems Network Architecture ("SNA") over a number of alternative connection media, such as cellular phone, radio frequency networks, or satellite networks. "AppleTalk" is a registered trademark of Apple Computer, Inc. The wireless network 42 preferably connects to the gateway 46 using a network connection 50a such as TCP or UDP (User Datagram Protocol) over IP, X.25, Frame Relay, ISDN (Integrated Services Digital Network), or PSTN (Public Switched Telephone Network). The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the workstation 10, other device such as those shown at 8 and 9, and/or server 47 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory 28, and accessed by the microprocessor 12 using the bus 14. Furthermore, networked storage, including storage area networks and network-attached storage, may also be used. The techniques and methods for embodying software programming code in memory, on physical media, and/or distributing software code via networks are well known and will not be further discussed herein.

A user of the present invention may connect his computing device to a server using a wired connection, or a wireless connection. Wired connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection. The user's computing device may be any type of computer processor, including laptop, handheld or mobile computers; vehicle-mounted devices; desktop computers; or mainframe computers, having processing and communication capabilities. The features of the present invention may also be accessed by users who are not using computing devices, but instead are using devices such as conventional telephone 11. The remote server, similarly, can be one of any number of different types of computer which have processing and communication capabilities. These techniques are well known in the art, and the hardware devices and software which enable their use are readily available.

In the preferred embodiments, the present invention is implemented as one or more modules (also referred to as code subroutines, or "objects" in object-oriented programming) of a computer software program (or programs). The program code of the preferred embodiments may be implemented as objects in an object-oriented programming language, or in a conventional procedurally-oriented language, or in a mix of object-oriented and procedural language code.

FIG. 3 is a high level flow chart that illustrates establishing a directory database, or data store, and a dynamic-content service and preferences in accordance with the present invention. The process starts as depicted by block 300 and thereafter passes to block 302, which illustrates establishing a database that includes directory information for a plurality of entities. Next, block 304 depicts establishing a dynamic contact service, which may include a dynamic contact database. The dynamic contact database includes dynamically updated contact information for a plurality of entities.

Ideally, for the function provided by this invention, each person or other entity whose information is available via the dynamic contact service should also be represented in the directory database. The dynamic contact information is updated to indicate the current contact information for each person whose information is stored in the dynamic contact database. The method and system for establishing such a database including dynamically updated contact information is described in the related patent applications referenced above and incorporated herein by reference.

Alternatively, the dynamic contact service may generate the dynamic contact information dynamically in response to each directory search request. In this case, a database of dynamic contact information is not maintained.

The process then passes to block 306, which illustrates receiving specified display preferences. The display preferences describe which directory and dynamic contact information will be displayed for each search result for which a directory search was executed. For example, a user may execute a search for a particular name. The user may choose to have displayed only the dynamic contact information, only the directory information, or a combination of both directory and dynamic contact information. In addition, the user may choose to have displayed only selected parts of the directory information, selected parts of the dynamic contact information, or selected parts of a combination of directory and dynamic contact information.

Next, block 308 depicts receiving specified filtering and sorting preferences for filtering and sorting information when the search results in information for a plurality of entities. The process then terminates as illustrated by block 310.

Figure 4:
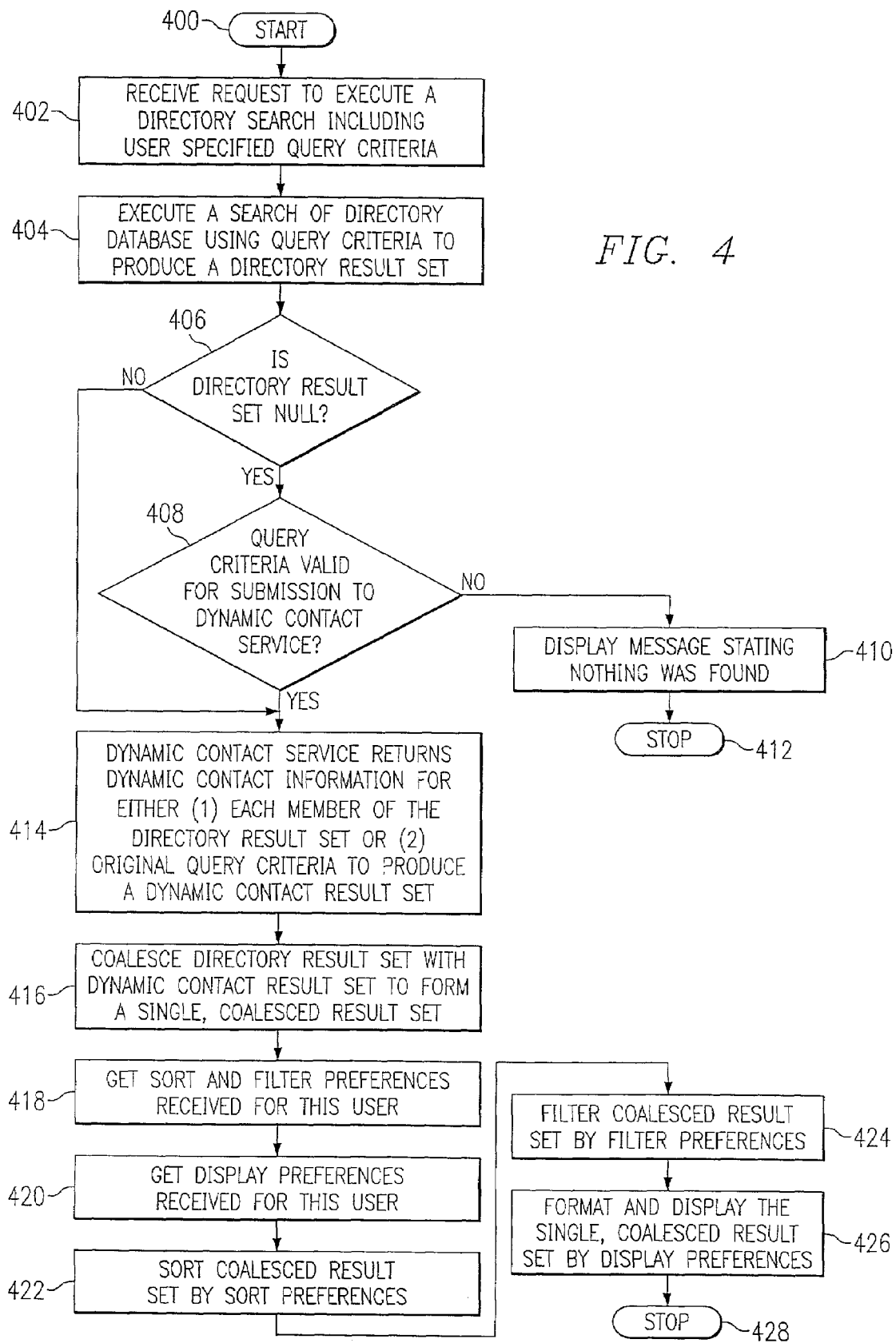
FIG. 4 is a high level flow chart which illustrates executing a directory search utilizing query criteria and displaying directory and dynamically updated contact information in response to the search in accordance with the present invention.

FIG. 4 is a high level flow chart that illustrates executing a directory search for a specific query criteria which results in a display of directory and dynamically updated contact information in accordance with the present invention. The process starts as depicted by block 400 and thereafter passes to block 402, which illustrates a receipt of a query criteria specified by a user when the user requested an enhanced directory search. Alternatively, this query criteria could be generated by another routine. For example, a routine which generates a list of names of people meeting a particular specification could be generated. This list of names could then be submitted to use to execute a directory search. Other examples of generating query criteria include selecting names from an address book, selecting e-mail addresses from address fields of an e-mail message, selecting names from an invitation list of a calendar entry, selecting names from a directory search, such as selecting names while viewing a list of names returned in response to a directory search, and/or receiving a list of phone numbers from another routine.

Next, block 404 depicts executing a directory search of the directory database using the query criteria producing a directory results set. If this results set happens to return a null set, it may still be possible to retrieve some useful information about the query criteria from the dynamic contact service, if the query criteria is a valid query criteria for the dynamic contact service. Thus, after receiving the result set from step 404, a check is done as depicted by block 406 to determine if the result set is null. If the result set is not null, the process passes to block 414.

Referring again to block 406, if the result set is null, the process passes to block 408 which illustrates a determination of whether or not the query criteria is valid for submission to the dynamic contact service. If a determination is made that the query criteria is valid for submission to the dynamic contact service, the process passes to block 414. Referring again to block 408, if a determination is made that the query criteria is not valid for submission to the dynamic contact service, the process passes to block 410 which depicts displaying a message which states that nothing was found. The process then terminates as illustrated by block 412.

Block 414 illustrates a mechanism whereby a dynamic contact search is executed using the dynamic contact service for the entities included in the directory results set if that set was not null, or for the original query criteria if the directory result set was null in order to produce a dynamic contact result set.

Thereafter, block 416 depicts coalescing the directory and dynamic contact result sets to form a single, coalesced result set. Next, block 418 illustrates getting the filter and sort preferences for the current user who submitted the query. Examples of these preferences include specifying a maximum number of names to display at one time, specifying required availability, such as specifying a display of only those people immediately available for a telephone call, and specifying an order of display of names where the first displayed names are for people who are available earlier than the people whose names are displayed later. The process passes to block 420, which depicts getting the display preferences for the current user who submitted the query. One example of display preferences is to display the name, current phone number, and telephone availability for each name found during the search.

Thereafter, block 422 illustrates sorting the single, coalesced result set according to the sort preferences specified by the current user. For example, the result set may be sorted such that the people who are immediately available are arranged and listed first in the result set. Next, block 424 illustrates filtering the single, coalesced result set according to the filter preferences. For example, the preferences may specify that only the names of the people included in the coalesced result set who are available by phone are to be displayed. The process then passes to block 426, which depicts formatting and displaying the coalesced result set according to the display preferences. The process then terminates as illustrated by block 428.

FIG. 5 is an example of a graphical user interface display screen that displays a single, coalesced result set of a directory search in accordance with the present invention. For example, in response to a directory search, a single name, "Robert Sundstrom", was found. The information depicted in FIG. 5 is returned as the result of the search. The information includes both directory information, such as name, address, and telephone number, and contact information such as status, and availability in-person, availability by phone, immediate contact means, and alternate contact person. The dynamic contact information is dynamically updated to indicate a current contact status for "Robert Sundstrom". Therefore, the next time an enhanced directory search is executed for this name, the dynamic contact information will have been changed if the current contact and availability status of this person has changed.

FIG. 6 is an example of a graphical user interface display screen that displays the results of a directory search which produced multiple names in accordance with the present invention. The user requesting the directory search has specified filter and sort preferences such that only those people listed in the coalesced result set who are available today are listed. Further, the sort preferences require the display of people who are more readily available at the top of the displayed result.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

Other types of data organization and storage may be used to store the information herein called the directory database and the dynamic contact database.

What is claimed is:

1. A method in a computer system for providing contact information in response to a directory search, said method comprising:
   receiving a user request to execute a directory search;
   receiving a query criteria;
   executing a search of a directory database in response to said user request, said search utilizing said query criteria to produce a first result comprising a null set or directory information corresponding to at least one entity, wherein said directory database comprises static information and does not comprise dynamically updated contact information;
   invoking a dynamic contact information service utilizing at least one of said first result and said query criteria to produce a second result comprising dynamic contact information; and
   coalescing said first and second results to produce a coalesced result.

2. The method according to claim 1, wherein said query criteria is specified by said user when requesting said directory search.

3. The method according to claim 1, wherein said query criteria is generated by a routine and is submitted for use in said directory search.

4. The method according to claim 1, wherein said query criteria is generated by selecting said criteria from at least one source of information.

5. The method according to claim 1, further comprising:
   determining whether said first result comprises said null set;
   invoking said dynamic contact information service to produce said second result utilizing said query criteria if said first result comprises said null set; and
   invoking said dynamic contact information service to produce said second result utilizing said at least one entity of said first result if said first result is not said null set.

6. The method according to claim 1, further comprising:
   determining whether said first result comprises said null set;
   invoking said dynamic contact information service to produce said second result utilizing said at least one entity of said first result if said first result is not said null set;
   determining whether said query criteria is valid for submission to said dynamic contact information service if said first result comprises said null set;
   invoking said dynamic contact information service to produce said second result utilizing said query criteria if said first result comprises said null set and said query criteria is valid for submission to said dynamic contact information service; and
   returning no search results if said first result comprises said null set and said query criteria is not valid for submission to said dynamic contact information service.

7. The method according to claim 1, wherein said dynamic contact service produces said second result at least by searching a dynamic content database for dynamically updated information.

8. The method according to claim 1, wherein said dynamic contact service produces said second result at least by dynamically determining contact information in response to each search request.

9. The method according to claim 1, further comprising using said coalesced result as an input into another application.

10. The method according to claim 1, further comprising:
    specifying display preferences that describe which directory database and dynamic contact information will be displayed for each executed search; and
    displaying said coalesced result based upon said display preferences.

11. The method according to claim 1, wherein said display preferences comprise:
    specifying whether to have displayed at least a part of only said dynamic contact information, at least a part of only said directory information, or at least parts of a combination of both directory and dynamic contact information for each executed search.

12. The method according to claim 1, further comprising:
    specifying sort preferences that describe bow said coalesced results are to be sorted for each executed search; and
    displaying said coalesced result based upon said sort preferences.

13. The method according to claim 12, wherein said sort preferences comprise availability; and
    displaying said coalesced data comprises displaying names where a first displayed name is available earlier than a remainder of people whose names are displayed.

14. The method according to claim 1, further comprising:
    specifying filtering preferences; and
    filtering said coalesced result using said filtering preferences to produce a filtered result and displaying said filtered result.

15. The method according to claim 14, wherein filtering said coalesced result using said filtering preferences comprises filtering said coalesced results based upon availability by a user-specified method of contact within a predetermined period of time.

16. The method according to claim 14, wherein filtering said coalesced result using said filtering preferences comprises filtering said coalesced results based upon availability by a user-specified type of contact within a predetermined period of time.

17. The method according to claim 14, wherein filtering said coalesced result using said filtering preferences comprises filtering said coalesced results based upon availability for an in-entity meeting within a particular period of time.

18. The method according to claim 14, wherein filtering said coalesced result using said filtering preferences comprises filtering said coalesced results based upon availability to check at least one of an e-mail account, an instant message, a telephone call and a page within a particular period of time.

19. The method according to claim 1, further comprising including within said coalesced result, an indication of an alternate contact entity for each entity whose information was returned as part of said coalesced result.

20. The method according to claim 1, further comprising including within said coalesced result, an indication of a physical location where each entity whose information was returned as part of said coalesced result can be reached during a particular period of time.

21. The method according to claim 1, further comprising including for each entity whose information was returned as part of said coalesced result, an indication of a means for contact where said entity will be available during a particular period of time.

22. The method according to claim 1, further comprising including for each entity whose information was returned as part of said coalesced result, an indication of whether an identified means of being contacted is currently being utilized.

23. The method according to claim 1, further comprising including for each entity whose information was returned as part of said coalesced result, an indication of a best means of contact.

24. A computer program product in a computer system for providing contact information in response to a directory search, said computer program product comprising:
a computer readable medium comprising recordable-type media having computer readable program code embodied therein, the computer readable medium comprising:
computer readable program code configured to receive a request by a user to execute a directory search;
computer readable program code configured to receive a query criteria;
computer readable program code configured to execute a search of a directory database in response to said user request, said search utilizing said query criteria to produce a first result comprising a null set or directory information corresponding to at least one entity, wherein said directory database comprises static information and does not comprise dynamically updated contact information;
computer readable program code configured to invoke a dynamic contact information service utilizing at least one of said first result and said query criteria to produce a second result comprising dynamic contact information; and
computer readable program code configured to coalesce said first and second result to produce a coalesce result.

25. The product according to claim 24, wherein said query criteria is specified by said user when requesting said directory search.

26. The product according to claim 24, further comprising computer readable program code implementing a routine configured to generate said query criteria which is submitted for use in said directory search.

27. The product according to claim 24, wherein said query criteria is generated by selecting said criteria from at least one source of information.

28. The product according to claim 24, further comprising:
computer readable program code configured to determine whether said first result comprises said null set;
computer readable program code configured to invoke said dynamic contact information service to produce said second result utilizing said query criteria if said first result comprises said null set; and
computer readable program code configured to invoke said dynamic contact information service to produce said second result utilizing said at least one entity of said first result if said first result is not said null set.

29. The product according to claim 24, further comprising:
computer readable program code configured to determine whether said first result comprises said null set;
computer readable program code configured to invoke said dynamic contact information service to produce said second result utilizing said at least one entity of said first result if said first result is not said null set;
computer readable program code configured to determine whether said query criteria is valid for submission to said dynamic contact information service if said first result comprises said null set;
computer readable program code configured to invoke said dynamic contact information service to produce said second result utilizing said query criteria if said first result comprises said null set and said query criteria is valid for submission to said dynamic contact information service; and
computer readable program code configured to return no search results if said first result comprises said null set and said query criteria is not valid for submission to said dynamic contact information service.

30. The product according to claim 24, further comprising computer readable program code configured to cause said dynamic contact service to produce said second result at least by searching a dynamic content database for dynamically updated information.

31. The product according to claim 24, further comprising computer readable program code configured to cause said dynamic contact service to produce said second result at least by dynamically determining contact information in response to each search request.

32. The product according to claim 24, further comprising computer readable program code configured to input said coalesced result into another application.

33. The product according to claim 24, further comprising:
computer readable program code configured to specify display preferences that describe which directory database and dynamic contact information will be displayed for each executed search; and
computer readable program code configured to display said coalesced result based upon said display preferences.

34. The product according to claim 24, wherein said display preferences comprise:
   computer readable program code configured to specify whether to have displayed only at least part of said dynamic contact information, only at least part of said directory information, or a combination of at least parts of both directory and dynamic contact information for each executed search.

35. The product according to claim 24, further comprising:
   computer readable program code configured to specify sort preferences that describe how said coalesced results are to be sorted for each executed search; and
   computer readable program code configured to display said coalesced result based upon said sort preferences.

36. The product according to claim 35, wherein said sort preferences comprise availability; and
   computer readable program code configured to display said coalesced data comprises displaying names where a first displayed name is available earlier than a remainder of people whose names are displayed.

37. The product according to claim 24, further comprising:
   computer readable program code configured to specify filtering preferences; and
   computer readable program code configured to filter said coalesced result using said filtering preferences to produce a filtered result and displaying said filtered result.

38. The product according to claim 37, wherein the computer readable program code configured to filter said coalesced result using said filtering preferences to produce a filtered result and displaying said filtered result comprises computer readable program code configured to filter said coalesced results based upon availability by a user-specified method of contact within a predetermined period of time.

39. The product according to claim 37, wherein the computer readable program code configured to filter said coalesced result using said filtering preferences to produce a filtered result and displaying said filtered result comprises computer readable program code configured to filter said coalesced results based upon availability by a user-specified type of contact within a predetermined period of time.

40. The product according to claim 37, wherein the computer readable program code configured to filter said coalesced result using said filtering preferences to produce a filtered result and displaying said filtered result comprises computer readable program code configured to filter said coalesced results based upon availability for an in-entity meeting within a particular period of time.

41. The product according to claim 37, wherein the computer readable program code configured to filter said coalesced result using said filtering preferences to produce a filtered result and displaying said filtered result comprises computer readable program code configured to filter said coalesced results based upon availability to check at least one of an e-mail account, an instant message, a telephone call and a page within a particular period of time.

42. The product according to claim 24, further comprising computer readable program code configured to include within said coalesced result, an indication of an alternate contact entity for each entity whose information was returned as part of said coalesced result.

43. The product according to claim 24, further comprising computer readable program code configured to include within said coalesced result an indication of a physical location where each entity whose information was returned as part of said coalesced result can be reached during a particular period of time.

44. The product according to claim 24, further comprising computer readable program code configured to include for each entity whose information was returned as part of said coalesced result, an indication of a means for contact where said entity will be available during a particular period of time.

45. The product according to claim 24, further comprising computer readable program code configured to include for each entity whose information was returned as part of said coalesced result, an indication of whether an identified means of being contacted is currently being utilized.

46. The product according to claim 24, further comprising computer readable program code configured to include for each entity whose information was returned as part of said coalesced result, an indication of a best means of contact.

47. A computer system for providing contact information in response to a directory search, comprising:
   a memory;
   a processor connected to access said memory:
   a directory database stored in said memory, said directory database comprising static information and does not comprise dynamically updated contact information:
   program instructions stored in said memory and executed by said processor, said program instructions comprising:
   instructions for receiving a request by a user to execute said directory search;
   instructions for receiving a query criteria;
   instructions for executing a search of a directory database in response to said user request, said search utilizing said query criteria to produce a first result comprising a null set or directory information corresponding to at least one entity;
   instructions for invoking a dynamic contact information service utilizing at least one of said first result and said query criteria to produce a second result comprising dynamic contact information and;
   instructions for coalescing said first and second results to produce a coalesced result.

48. The system according to claim 47, wherein said query criteria is specified by said user when requesting said directory search.

49. The system according to claim 47, further comprising program instructions implementing a routine that generates said query criteria.

50. The system according to claim 47, further comprising at least one source of information and program instructions for selecting said query criteria from said at least one source of information.

51. The system according to claim 47, further comprising:
   program instructions for determining whether said first result comprises said null set;
   program instructions for invoking said dynamic contact information service to produce said second result utilizing said query criteria if said first result comprises said null set; and
   program instructions for invoking said dynamic contact information service to produce said second result utilizing said at least one entity of said first result if said first result is not said null set.

52. The system according to claim 47, further comprising:
   program instructions for determining whether said first result comprises said null set;

program instructions for invoking said dynamic contact information service to produce said second result utilizing said at least one entity of said first result if said first result is not said null set;

program instructions for determining whether said query criteria is valid for submission to said dynamic contact information service if said first result comprises said null set;

program instructions for invoking said dynamic contact information service to produce said second result utilizing said query criteria if said first result comprises said null set and said query criteria is valid for submission to said dynamic contact information service; and program instructions for returning no search results if said first result comprises said null set and said query criteria is not valid for submission to said dynamic contact information service.

53. The system according to claim 47, further comprising program instructions for causing said dynamic contact service to produce said second result at least by searching a dynamic content database for dynamically updated information.

54. The system according to claim 47, further comprising program instructions for causing said dynamic contact service to produce said second result at least by dynamically determining contact information in response to each search request.

55. The system according to claim 47, further comprising program instructions for using said coalesced result as an input into another application.

56. The system according to claim 47, further comprising:
program instructions for specifying display preferences that describe which directory database and dynamic contact information will be displayed for each executed search; and
program instructions for displaying said coalesced result based upon said display preferences.

57. The system according to claim 47, wherein said display preferences comprise:
program instructions for specifying whether to have displayed only at least part of said dynamic contact information, only at least part of said directory information, or a combination of at least parts of both directory and dynamic contact information for each executed search.

58. The system according to claim 47, further comprising:
program instructions for specifying sort preferences that describe how said coalesced results are to be sorted for each executed search; and
program instructions for displaying said coalesced result based upon said sort preferences.

59. The system according to claim 58, wherein said sort preferences comprise availability; and
program instructions for displaying said coalesced data comprises displaying names where a first displayed name is available earlier than a remainder of people whose names are displayed.

60. The system according to claim 47, further comprising:
program instructions for specifying filtering preferences; and
program instructions for filtering said coalesced result using said filtering preferences to produce a filtered result and displaying said filtered result.

61. The system according to claim 60, wherein said program instructions for filtering said coalesced result using said filtering preferences comprises program instructions for filtering said coalesced results based upon availability by a user-specified method of contact within a predetermined period of time.

62. The system according to claim 60, wherein said program instructions for filtering said coalesced result using said filtering preferences comprises program instructions for filtering said coalesced results based upon availability by a user-specified type of contact within a predetermined period of time.

63. The system according to claim 60, wherein said program instructions for filtering said coalesced result using said filtering preferences comprises program instructions for filtering said coalesced results based upon availability for an in-entity meeting within a particular period of time.

64. The system according to claim 60, wherein said program instructions for filtering said coalesced result using said filtering preferences comprises program instructions for filtering said coalesced results based upon availability to check at least one of an e-mail account, an instant message, a telephone call and a page within a particular period at time.

65. The system according to claim 47, further comprising program instructions for including within said coalesced result, an indication of an alternate contact entity for each entity whose information was returned as pan of said coalesced result.

66. The system according to claim 47, further comprising program instructions for including within said coalesced result, an indication of a physical location where each entity whose information was returned as part of said coalesced result can be reached during a particular period of time.

67. The system according to claim 47, further comprising program instructions for including for each entity whose information was returned as part of said coalesced result, an indication of a means for contact where said entity will be available during a particular period of time.

68. The system according to claim 47, further comprising program instructions for including for each entity whose information was returned as pan of said coalesced result, an indication of whether an identified means of being contacted is currently being utilized.

69. The system according to claim 47, further comprising program instructions for including for each entity whose information was returned as part of said coalesced result, an indication of a best means of contact.

* * * * *

UNITED STATES PATENT AND TRADEMARK OFFICE
CERTIFICATE OF CORRECTION

| | |
|---|---|
| PATENT NO. | : 7,096,232 B2 |
| APPLICATION NO. | : 09/875556 |
| DATED | : August 22, 2006 |
| INVENTOR(S) | : J. Smith Doss et al. |

It is certified that error appears in the above-identified patent and that said Letters Patent is hereby corrected as shown below:

In the Claims:

Col. 11, line 66, "produce a coalesce result." should read -- produce a coalesced result.--;

Col. 16, line 29, "a particular period at time" should read -- a particular period of time--;

Col. 16, line 33, "was returned as pan of said" should read --was returned as part of said--;

Col. 16, line 47, "was returned as pan of said" should read --was returned as part of said--.

Signed and Sealed this

Second Day of October, 2007

JON W. DUDAS
*Director of the United States Patent and Trademark Office*